(12) United States Patent
Yang et al.

(10) Patent No.: US 7,697,094 B2
(45) Date of Patent: Apr. 13, 2010

(54) TRANSFLECTIVE-TYPE LIQUID CRYSTAL DISPLAY DEVICE AND METHOD OF FABRICATING THE SAME

(75) Inventors: Joon Young Yang, Kyonggi-do (KR); Yong In Park, Seoul (KR); Sang Hyun Kim, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 598 days.

(21) Appl. No.: 11/524,435

(22) Filed: Sep. 21, 2006

(65) Prior Publication Data
US 2007/0013842 A1 Jan. 18, 2007

Related U.S. Application Data

(62) Division of application No. 10/880,098, filed on Jun. 30, 2004, now Pat. No. 7,119,865.

(30) Foreign Application Priority Data
Oct. 16, 2003 (KR) .............................. P2003-77248

(51) Int. Cl.
*G02F 1/1335* (2006.01)
(52) U.S. Cl. .................. 349/114; 349/113; 349/138

(58) Field of Classification Search .................. None
See application file for complete search history.

(56) References Cited

U.S. PATENT DOCUMENTS

| | | | | | |
|---|---|---|---|---|---|
| 6,020,599 | A | * | 2/2000 | Yeo | 257/59 |
| 6,166,785 | A | * | 12/2000 | Ha | 349/42 |
| 6,657,695 | B1 | | 12/2003 | Song et al. | |
| 2003/0071944 | A1 | * | 4/2003 | Baek | 349/113 |
| 2005/0185130 | A1 | | 8/2005 | Oh et al. | |

* cited by examiner

*Primary Examiner*—Uyen-Chau N Le
*Assistant Examiner*—Chad H Smith
(74) *Attorney, Agent, or Firm*—Morgan, Lewis & Bockius LLP

(57) ABSTRACT

A transflective-type liquid crystal display device includes a plurality of gate and data lines crossing each other on a substrate to define a plurality of pixel regions, a thin film transistor at each crossing of the gate and data lines, the thin film transistor including a semiconductor layer, and source and drain electrodes contacting source and drain regions, respectively, a projection seed pattern within the pixel region along a same layer as the semiconductor layer of the thin film transistor, and a reflective electrode contacting the drain electrode of the thin film transistor and having a reflective projection corresponding to the projection seed pattern.

5 Claims, 7 Drawing Sheets

TRANSFLECTIVE-TYPE LIQUID CRYSTAL DISPLAY DEVICE AND METHOD OF FABRICATING THE SAME

This application is a Divisional of U.S. patent application Ser. No. 10/880,098, filed Jun. 30, 2004 now U.S. Pat. No. 7,119,865 and claims the benefit of the Korean patent Application No. P2003-77248 filed on Oct. 16, 2003, both of which are hereby incorporated by reference in their entirety.

BACKGROUND OF THE INVENTION

1. Field of the Invention

The present invention relates to a liquid crystal display (LCD) device and a method of fabricating an LCD device, and more particularly, to a transflective-type LCD device and a method of fabricating a transflective-type LCD device.

2. Discussion of the Related Art

Currently, many different types of flat display devices are being developed, such as LCD devices, field emission display (FED) devices, electroluminescent display (ELD) devices, and plasma display panel (PDP) devices. Among these various types of flat display devices, the LCD devices are commonly used due to their thin profile, light weight, and low power consumption.

The LCD devices may be classified into one of two different types: a transmitting-type LCD device and a reflective-type LCD device, according to use of a light source. The transmitting-type LCD device uses a backlight device, wherein the transmitting-type LCD device can display images in relatively low light surroundings by controlling a light transmittance according to alignment of liquid crystal molecules. However, the transmitting-type LCD device requires high power consumption. On the other hand, the reflective-type LCD device makes use of ambient light, thereby requiring a relatively small amount of power consumption. However, the reflective-type LCD device cannot display images in relatively low light surroundings, such as when there is cloudy or unclear weather. Accordingly, the reflective-type LCD is commonly used for electronic equipment, such as watches or calculators, that require low power consumption, and the transmitting-type LCD device is commonly used for large-sized notebook computers requiring production of high quality images.

In order to overcome the problems of the transmitting- and reflective-type LCD devices, a transflective-type (reflective-transmitting) LCD device has been developed. The transflective-type LCD device can operate as the reflective- or transmitting-type LCD device depending on the surrounding light conditions. For example, when large amounts of ambient light is available, the transflective-type LCD device may be enabled to function as the reflective-type LCD device, wherein the ambient light incident through an upper substrate is reflected onto a reflective electrode. Conversely, in relatively low light surroundings, the transflective-type LCD device may be enabled to function as the transmitting-type LCD device using the backlight device, wherein the light emitted from the backlight device is incident to liquid crystal material through an opening part of the reflective electrode.

FIGS. 1A to 1F are cross sectional views of a method of fabricating a transflective-type LCD device according to the related art. In FIG. 1A, a low-resistance conductive metal layer is deposited onto a transparent substrate 11 made of glass or quartz by a sputtering method, and a gate line (not shown) and a gate electrode 12 are formed by a photolithographic process using a first mask. Accordingly, the gate lines are formed along one direction at fixed intervals, wherein the gate electrode 12 diverges from each of the gate lines. Forming the gate line and gate electrodes includes coating a photoresist material, which is sensitive to ultraviolet light, onto the substrate, exposing and developing the photoresist material using a mask to form a photoresist pattern, etching material layers using the photoresist pattern, and stripping the photoresist pattern away.

Next, silicon nitride $SiN_x$ or silicon oxide $SiO_x$ is deposited along an entire surface of the substrate 11 including the gate electrode 12 by a PECVD method to form a gate insulating layer 13. Then, a first amorphous silicon layer and a second amorphous silicon layer doped with n-type impurities are sequentially deposited onto an entire surface of the substrate 11 including the gate insulating layer 13, and patterned by a photolithographic process using a second mask, thereby forming the semiconductor layer 14. The second amorphous silicon layer doped with the n-type impurities is formed to provide an ohmic contact with subsequently-formed source/drain electrodes, and the island-shaped semiconductor layer 14 is formed on the gate insulating layer 13 above the gate electrode 12.

In FIG. 1B, a low-resistance metal layer is deposited along an entire surface of the substrate 11 including the semiconductor layer 14, and patterned by a photolithographic process using a third mask to form a data line (not shown) and the source/drain electrodes 15a/15b. Accordingly, the data line crosses the gate line to define a pixel region, and the source/drain electrodes 15a/15b are formed at both sides of the semiconductor layer 14. Thus, a thin film transistor includes the gate electrode 12, the semiconductor layer 14, and the source/drain electrodes 15a/15b. Although not shown, a portion of the ohmic contact layer is removed directly above a channel region of the semiconductor layer 14.

In FIG. 1C, an organic insulating layer having photosensitive light characteristics is formed along an entire surface of the substrate 11 including the thin film transistor by a spin-coating method, thereby forming a passivation layer 16 having a predetermined thickness. Then, a photoacryl resin is deposited onto an entire surface of the substrate 11 including the passivation layer 16, and a plurality of photoacryl resin patterns are formed at fixed intervals by a photolithographic process using a fourth mask. As a result, hemispheric projection patterns 90 are formed by a reflow of the photoacryl resin patterns. Next, a predetermined portion of the passivation layer 16 is removed by a photolithographic process using a fifth mask to form a contact hole 18 exposing the drain electrode 15b.

In FIG. 1D, a transparent conductive material, such as ITO (indium-tin-oxide), is deposited on the passivation layer 16 including the plurality of projection patterns 90, and patterned by a photolithographic process using a sixth mask, thereby forming a transmitting (transparent) electrode 17 contacting the drain electrode 15b.

In FIG. 1E, an insulating interlayer 24 is deposited along an entire surface of the substrate 11 including the pixel electrode 17, and a portion of the insulating interlayer 24 corresponding to the contact hole 18 is removed by a photolithographic process using a seventh mask. Accordingly, some portion of the drain electrode 15b or the transmitting electrode 17 is exposed by the contact hole 18.

Subsequently, a metal layer having a high reflexibility, such as aluminum Al, copper Cu, or silver Ag, is formed along an entire surface of the substrate 11 including the insulating interlayer 24, and patterned by a photolithographic process using an eighth mask, thereby forming the reflective electrode 19. At this time, the reflective electrode 19 contacts the drain electrode 15b or the transmitting electrode 17 through the contact hole 18, wherein the reflective electrode 19 is formed within the reflective part of a unit pixel region. For example, the reflective electrode 19 is formed of the high reflexibility metal in the reflective part of the unit pixel region, and the transmitting electrode 17 is formed of the transparent conductive material in the transmitting part, thereby completing a thin film transistor (TFT) substrate 11 having both transmitting and reflective functions.

In FIG. 1F, the TFT substrate 11 is disposed opposite to a color filter substrate 33 having a color filter layer by a sealant, and includes spacers disposed between the TFT and color filter substrates 11 and 33 to maintain a cell gap. Then, a liquid crystal material is injected through an inlet into the cell gap between the TFT and color filter substrates 1 and 33 to form the liquid crystal layer 40. Next, the inlet for injection of the liquid crystal material is sealed, thereby completing the LCD device.

According to the related art, the TFT substrate 11 includes an amorphous silicon. semiconductor layer formed using a photolithographic process using eight separate masks. For example, the processes for forming the gate line (not shown), the semiconductor layer 14, the data line (not shown), the contact hole 18 of the passivation layer 16, the transmitting electrode. 17, the contact hole of the insulating interlayer 24, the projection pattern 90, and the reflective electrode 19 each requires its own individual mask and mask step.

FIGS. 2A to 2G are cross sectional views of another method of fabricating a transflective-type LCD device according to the related art. In FIG. 2A, a buffer layer 152 of silicon oxide is formed along an entire surface of a transparent substrate 111 made of glass or quartz. Then, an amorphous silicon layer is formed on the buffer layer 152, and a laser beam is irradiated onto the amorphous silicon layer, thereby the crystallizing the amorphous silicon layer into a polysilicon layer 144. The process of crystallizing the amorphous silicon into the polysilicon may be performed using various different methods. Among these various different methods, a Field Enhanced Metal Induced Crystallization (FEMIC) technique using catalytic metal is commonly used, which has advantageous characteristics including rapid crystallization speed, low cost, and suitability for large-sized glass substrates.

In FIG. 2B, the crystallized polysilicon layer 144 is patterned by a photolithographic process using a first mask, thereby forming an activated semiconductor layer 154.

In FIG. 2C, an inorganic insulating layer, such as silicon nitride $SiN_x$ or silicon oxide $SiO_x$, is formed along an entire surface of the substrate 111 including the semiconductor layer 154 to form a gate insulating layer 113. Then, a metal layer of aluminum Al or aluminum alloy AlNd is formed on the gate insulating layer 113, and patterned by a photolithographic process using a second mask to form a gate electrode 112. Then, n-type impurity ions are implanted into the semiconductor layer 154 using the gate electrode 112 as a mask, thereby forming source/drain regions 115a and 115b. In addition, a channel layer 114 is formed between the source region 115a and the drain region 115b. Although not shown, a gate line is simultaneously formed with the gate electrode 112.

In FIG. 2D, an inorganic insulating layer of $SiN_x$ or $SiO_x$ is formed along an entire surface of the substrate 111 including the gate electrode 112 to form a first insulating interlayer 123. Then, the first insulating interlayer 123 and the gate insulating layer 113 are selectively removed by a photolithographic process using a third mask to form a first contact hole 181 exposing the source/drain regions 115a and 115b.

Next, a metal layer of aluminum Al or aluminum alloy AlNd is formed on the first insulating interlayer 123 to bury the first contact hole 181, and patterned by a photolithographic process using a fourth mask. Accordingly, source/drain electrodes 115c and 115d are formed and connected to the source/drain regions 115a and 115b. Thus, a polysilicon TFT (poly-TFT) comprising the gate electrode, the polysilicon semiconductor layer, and the source/drain electrodes may be formed.

In FIG. 2E, an inorganic insulating material of silicon nitride or an organic insulating material of BCB is deposited along an entire surface of the substrate 111 including the poly-TFT, thereby forming a passivation layer 116. Then, photoacryl resin having photosensitive characteristics is deposited along an entire surface of the substrate 111 including the passivation layer 116, and patterned by a photolithographic process using a fifth mask. Accordingly, a plurality of projection patterns 190 are formed at fixed intervals by a reflow process. The projection patterns 190 are formed in a predetermined part including a reflective part, whereby a reflective electrode is formed along a surface of the substrate including the plurality of projection patterns 190. Accordingly, the reflective electrode includes the plurality of projection patterns 190 to obtain a wide viewing angle by scattering the ambient light. Then, a predetermined portion of the passivation layer 116 is removed by a photolithographic process using a sixth mask to expose the drain electrode 115b, thereby forming a second contact hole 191.

In FIG. 2F, a transparent conductive material, such as ITO (indium-tin-oxide), is deposited along an entire surface of the substrate 111 including the plurality of projection patterns 190, and patterned by a photolithographic process using a seventh mask, thereby forming a transmitting electrode 117 in the pixel region to contact the drain electrode 115b.

In FIG. 2G, a second insulating interlayer 124 is deposited along an entire surface of the substrate 111 including the transmitting electrode 117, and the second insulating interlayer 124 corresponding to the second contact hole 191 is removed by a photolithographic process using an eighth mask. Accordingly, some portion of the drain electrode 115b or the transmitting electrode 117 is exposed by the second contact hole 191. Subsequently, a metal layer of high reflexibility material, such as aluminum Al, copper Cu, or silver Ag, is formed along an entire surface of the substrate 111 including the second insulating interlayer 124, and patterned by a photolithographic process using a ninth mask, thereby forming the reflective electrode 119. Accordingly, the reflective electrode 119 is connected to some portion of the drain electrode 115b or the transmitting electrode 117 through the second contact hole 119, and the reflective electrode 119 is formed in the reflective part of the unit pixel region. For example, the reflective electrode 119 using the high reflexibility metal is formed in the reflective part of the unit pixel region, and the transmitting electrode 117 using the transparent conductive material is formed in the transmitting part, thereby fabricating a TFT substrate 111 that operates having both transmitting and reflective functions.

Accordingly, the TFT substrate 111 of the transflective-type LCD device including the poly-TFT requires photolithographic processes using nine separate masks. For example, the processes for forming the semiconductor layer 154, the gate line (not shown), the first contact hole 181, the data line (not shown), the second contact hole 191 of the passivation layer 116, the projection pattern 190, the transmitting electrode 117, the second contact hole 191 of the second insulating interlayer 124, and the reflective electrode 119.

However, according to the related art, the transflective-type LCD device and the method of fabricating the transflective-type LCD device have disadvantages, such as the number of photolithographic processes increases, fabrication costs and errors of the fabrication process increases, and productivity decreases.

SUMMARY OF THE INVENTION

Accordingly, the present invention is directed to a transflective-type LCD device and a method of fabricating a transflective-type LCD device that substantially obviates one or more problems due to limitations and disadvantages of the related art.

An object of the present invention is to provide a transflective-type LCD device having decreased fabrication costs and reduced fabrication time.

Another object of the present invention is to provide a method for fabricating a transflective-type LCD device to decrease fabrication costs and reduce fabrication time.

Additional features and advantages of the invention will be set forth in part in the description which follows, and in part will be apparent from the description, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described, a transflective-type liquid crystal display device includes a plurality of gate and data lines crossing each other on a substrate to define a plurality of pixel regions, a thin film transistor at each crossing of the gate and data lines, the thin film transistor including a semiconductor layer, and source and drain electrodes contacting source and drain regions, respectively, a projection seed pattern within the pixel region along a same layer as the semiconductor layer of the thin film transistor, and a reflective electrode contacting the drain electrode of the thin film transistor and having a reflective projection corresponding to the projection seed pattern.

In another aspect, a method of fabricating a transflective-type liquid crystal display device includes forming a buffer layer and a semiconductor layer on a substrate, patterning the buffer layer and the semiconductor layer to simultaneously form an active layer of a thin film transistor and a projection seed pattern, forming a gate insulating layer along an entire surface of the substrate, forming a gate electrode on the gate insulating layer above the active layer, forming source/drain regions within the active layer using the gate electrode as a mask, depositing an insulating interlayer along an entire surface of the substrate, forming source/drain electrodes connected to the source/drain regions, forming a passivation layer along an entire surface of the substrate including the source/drain electrodes, forming a first pixel electrode on the passivation layer to contact the drain electrode, and forming a second pixel electrode contacting one of the first pixel electrode and the drain electrode.

In another aspect, a transflective-type liquid crystal display device includes a substrate having a plurality of gate and data lines crossing each other to define a plurality of pixel regions, a buffer layer on the substrate, the buffer layer including a plurality of first portions each having a first thickness and a plurality of second portions each having a second thickness less than the first thickness, a polysilicon layer on the buffer layer, the polysilicon layer including a plurality of first portions each disposed on one of the plurality of first portions of the buffer layer, one of the second portions including source and drain regions, a gate insulating layer on the first portions of the polysilicon layer and the first and second portions of the buffer layer, a gate electrode and the plurality of gate lines on the gate insulating layer, a first insulating interlayer on the gate electrode and the first and second portions of the buffer layer, first and second contact holes through the gate insulating layer and the first insulating interlayer exposing portions of the source and drain regions, source and drain electrodes in the first and second contact holes contacting the exposed portions of the source and drain regions, respectively, a passivation layer on the source and drain electrodes and the first and second portions of the buffer layer, the passivation layer including a third contact hole exposing a portion of the drain electrode, a transparent electrode on the passivation layer and contacting the exposed portion of the drain electrode in the third contact hole of the passivation layer, a second insulating interlayer on the transparent electrode, the passivation layer, and the first and second portions of the buffer layer, the second insulating interlayer having a fourth contact hole exposing a portion of the transparent electrode, and a reflecting electrode on the second insulating interlayer and the first and second portions of the buffer layer, the reflecting electrode contacting the exposed portion of the transparent electrode through the fourth contact holes of the second insulating interlayer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1A:
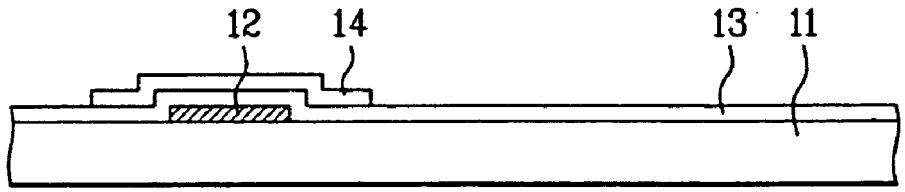
FIGS. 1A to 1F are cross sectional views of a method of fabricating a transflective-type LCD device according to the related art.
Figure 1B:
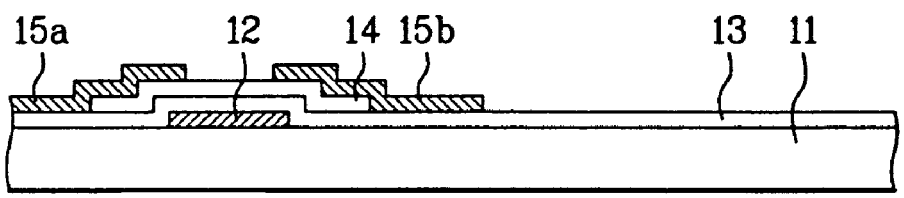
Figure 1C:
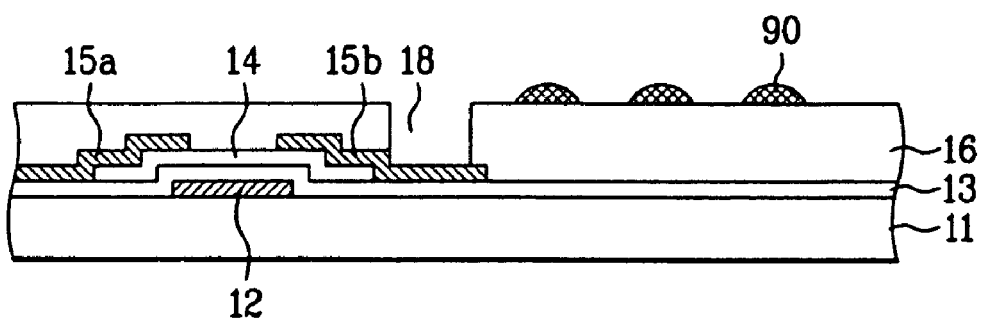
Figure 1D:
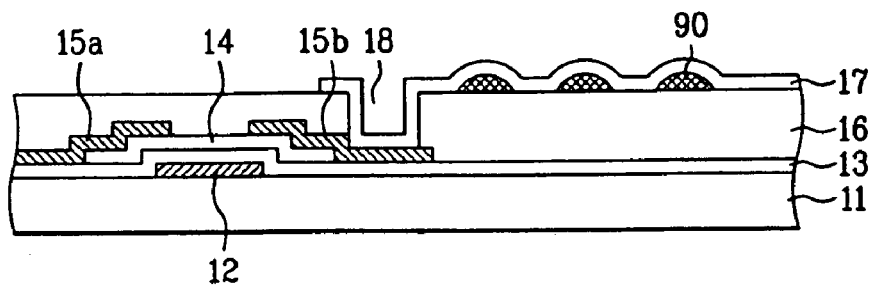
Figure 1E:
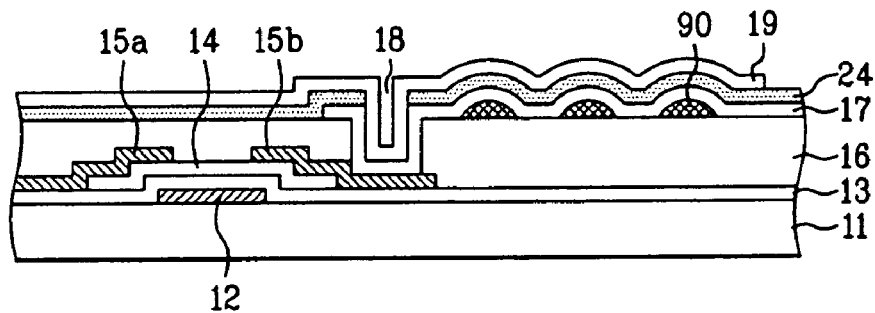
Figure 1F:
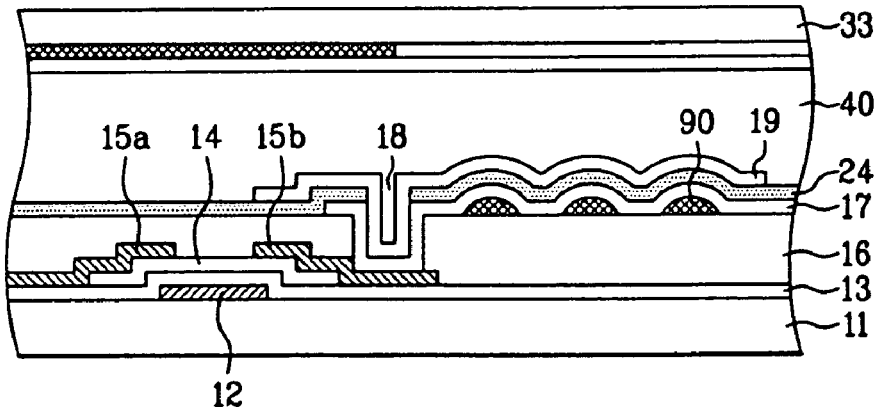
Figure 2A:
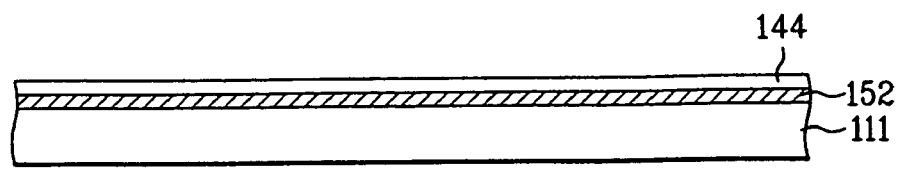
FIGS. 2A to 2G are cross sectional views of another method of fabricating a transflective-type LCD device according to the related art.
Figure 2B:
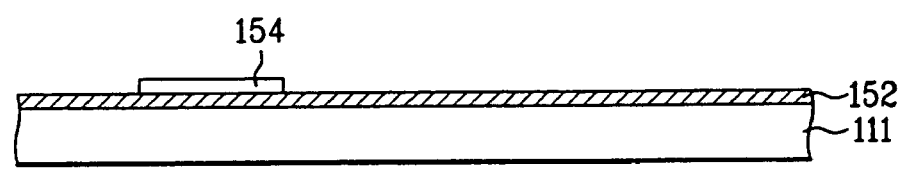
Figure 2C:
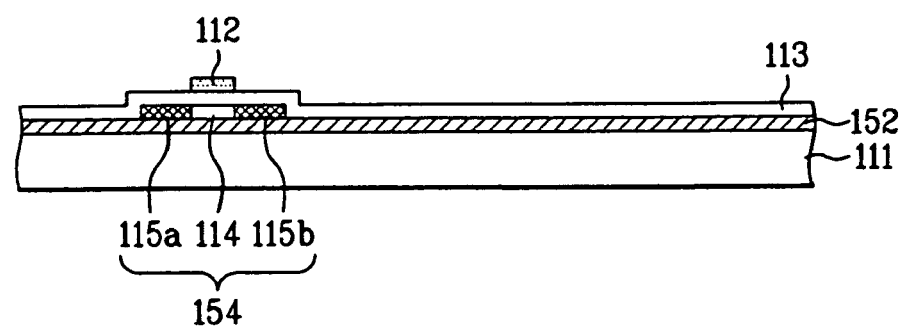
Figure 2D:
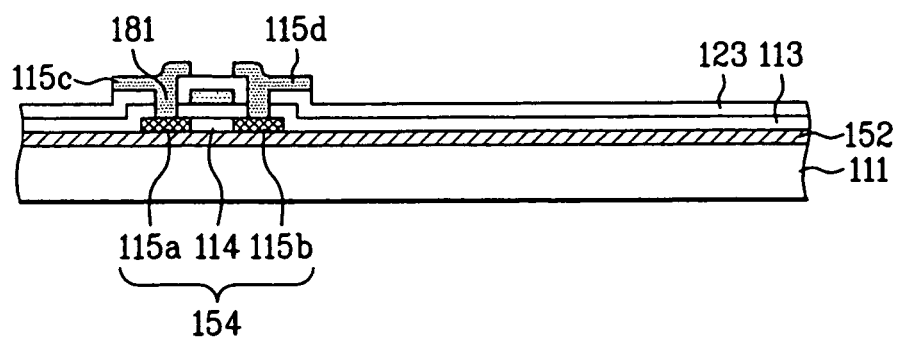
Figure 2E:
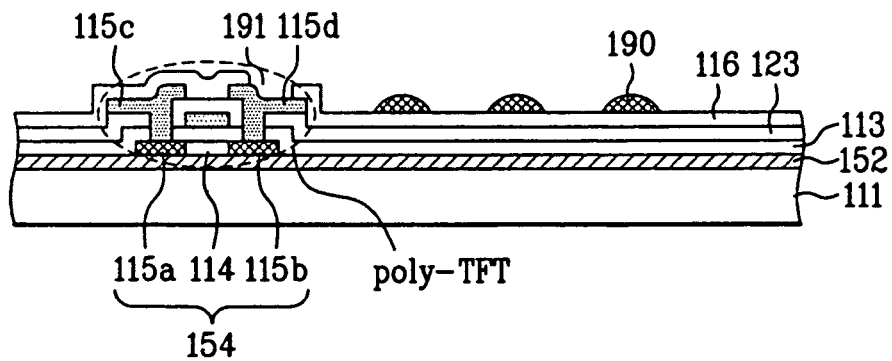
Figure 2F:
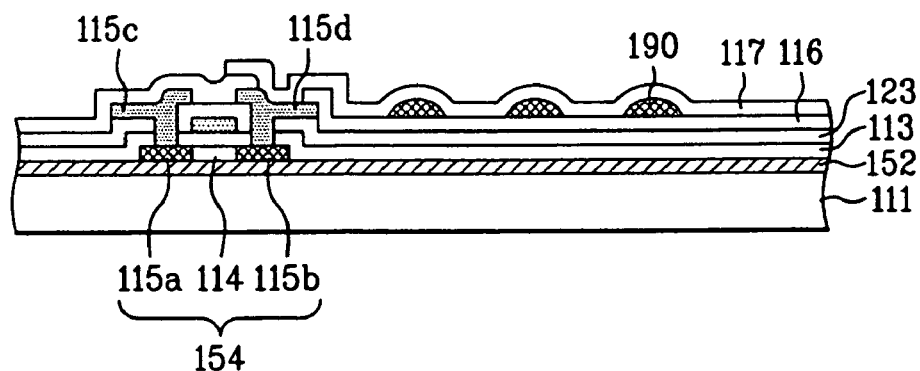
Figure 2G:
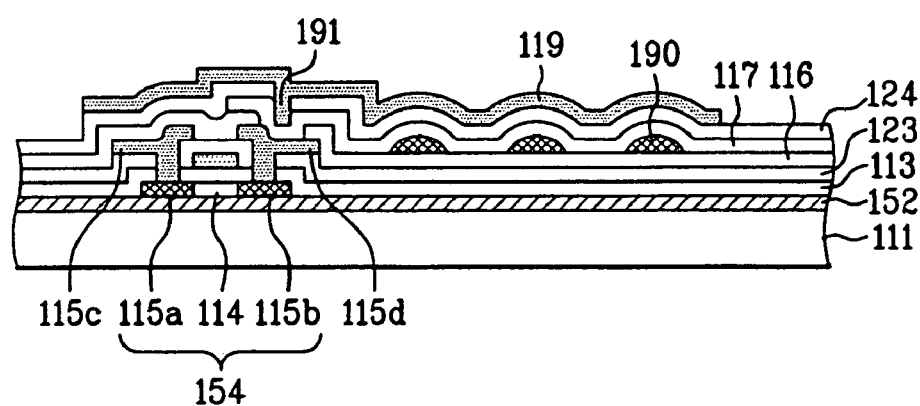
Figure 3A:
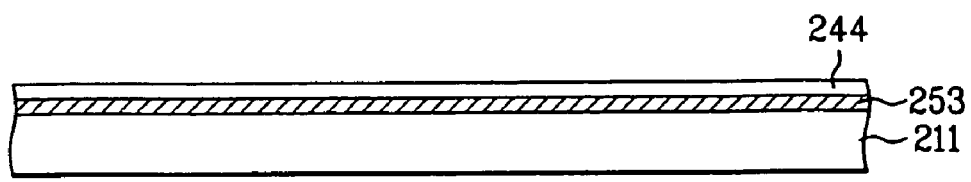
FIGS. 3A to 3F are cross sectional views of an exemplary method of fabricating a transflective-type LCD device according to the present invention.

FIGS. 3A to 3F are cross sectional views of an exemplary method of fabricating a transflective-type LCD device according to the present invention. In FIG. 3A, an insulating material, such as silicon oxide $SiO_x$, may be formed on an insulating substrate 211 by a Chemical Vapor Deposition (CVD) method, thereby forming a buffer layer 253 having a thickness of about 3000 Å. The buffer layer 253 may prevent foreign material from penetrating into a subsequently-formed polysilicon layer 244, and may protect the insulating substrate 211 during high temperature crystallization processing of an amorphous silicon layer. In addition, the buffer layer 253 may improve contact characteristics between the polysilicon layer 244 and the insulating substrate 211, and the buffer layer 253 may function as one portion of a projection seed pattern 290 (in FIG. 3B). Subsequently, the polysilicon layer 244 may be formed on the buffer layer 253 having a thickness of about 500 Å.

A method of forming the polysilicon layer 244 may be classified into one of two different types: (1) direct deposition of a polysilicon layer; and (2) deposition and crystallization of an amorphous silicon layer into a polycrystalline silicon layer. In addition, the direct deposition method may be classified into one of a Low Pressure Chemical Vapor Deposition (LPCVD) process and a Plasma Enhanced Chemical Vapor Deposition PECVD) process, wherein the LPCVD process may be performed at a relatively high temperature above about 550° C., and the PECVD method may be performed at a temperature of about 400° C. or less by using a mixture of $SiF_4/SiH_4/H_2$ gases. The deposition and crystallization method may be classified into one of a Solid Phase Crystallization (SPC) process, an Eximer Laser Annealing (ELA) process, and a Metal Induced Crystallization (MIC) process. The SPC process may be performed using a heat treatment at a relatively high temperature for an extended period of time, the ELA process may be performed by irradiating a beam from an eximer laser at a temperature of about 250° C., and the MIC process may be performed by depositing a metal layer onto an amorphous silicon layer and inducing crystallization of the amorphous silicon.

Figure 3B:
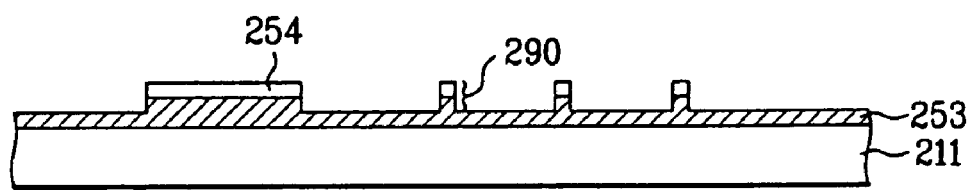

In FIG. 3B, the buffer layer 253 and the polysilicon layer 244 may be simultaneously patterned by a photolithographic process using a first mask, thereby forming a semiconductor layer 254 and a projection seed pattern 290 at a predetermined thickness and width. The projection seed pattern 290 may function as a seed for formation of a reflective projection. Then, the polysilicon layer 244 may be completely etched, and the buffer layer 253 may be under-etched at a predetermined thickness.

Figure 3C:
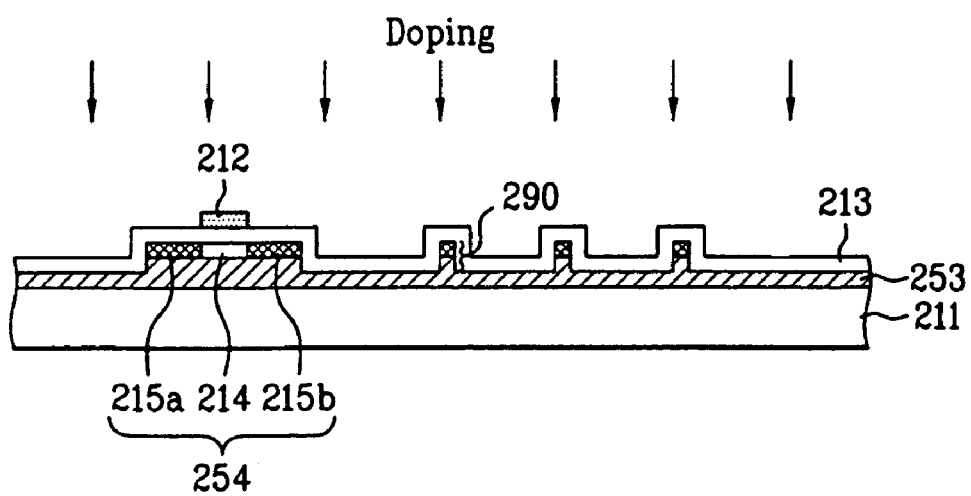

In FIG. 3C, an inorganic insulating material of silicon oxide $SiO_x$ or silicon nitride $SiN_x$ may be deposited along an entire surface of the substrate 211 including the semiconductor layer 254 and the projection seed pattern 290 by a PECVD process, thereby forming a gate insulating layer 213. Then, a low-resistance metal layer, such as copper Cu, aluminum Al, aluminum alloy AlNd, molybdenum Mo, chrome Cr, titanium Ti, tantalum Ta, or molybdenum-tungsten MoW, may be deposited onto the gate insulating layer 213, and patterned by a photolithographic process using a second mask, thereby forming a gate electrode 212. Although not shown, the gate electrode 212 may be formed along with formation of a gate line that transmits scanning signals. For etching the low-resistance metal layer for forming the gate electrode 212, a wet-etch method may be employed using hydrofluoric (HF) acid, a buffered oxide (BO) etchant, $NH_4F$, or a mixture thereof. The wet-etch method may be classified into one of a dipping process for dipping a substrate into a container having a chemical etchant, and a spraying process for spraying a chemical etchant onto a substrate.

Subsequently, n-type impurity ions may be implanted into the semiconductor layer 254 using the gate electrode 212 as a mask, and an ion implantation area may be activated. For example, the semiconductor layer 254 may be doped with ions, such as phosphorus P or boron B, thereby forming n-type first and second source/drain regions 215a and 215b. In addition, a predetermined portion of the semiconductor layer 254 into which the n-type impurity ions are not implanted may serve as a channel layer 214. Then, an LDD doping layer may be formed within the n-type first and second source/drain regions 215a and 215b adjacent to the gate electrode 212, thereby reducing a turning-OFF current by decreasing a corresponding electric field of a contact region.

Figure 3D:
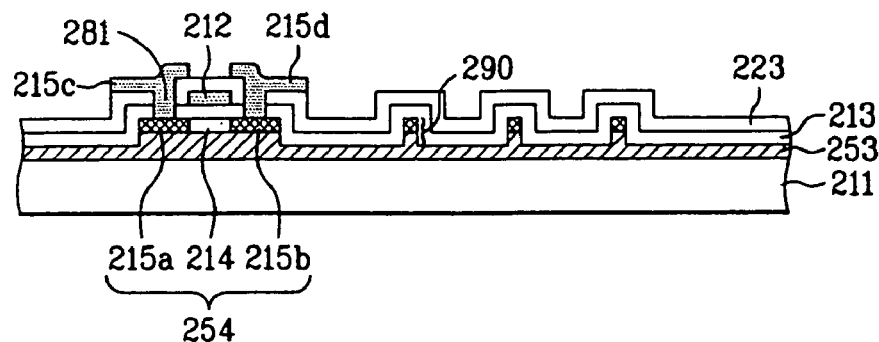

In FIG. 3D, a first insulating interlayer 223 may be formed along an entire surface of the substrate 211 including the gate electrode 212. Then, the gate insulating layer 213 and the first insulating interlayer 223 may be partially removed by a photolithographic process using a third mask, thereby forming a first contact hole 281 exposing the source/drain regions 215a and 215b. Next, a metal layer, such as copper Cu, aluminum Al, aluminum alloy AlNd, molybdenum Mo, chrome Cr, titanium Ti, tantalum Ta, or molybdenum-tungsten MoW, may be deposited along an entire surface of the substrate 211 including the first insulating interlayer 223 to bury the first contact hole 281. Then, the metal layer may be patterned by a photolithographic process using a fourth mask, thereby forming source/drain electrodes 215c and 215d. Accordingly, the source/drain electrodes 215c and 215d may contact the source/drain regions 215a and 215b through the first contact hole 281. Although not shown, the source/drain electrodes 215c and 215d may be formed with a data line that may transmit data signals, wherein the data line may be perpendicular to the gate line to define a pixel region. In addition, the gate electrode 212, the polysilicon semiconductor layer 254, and the source/drain electrodes 215c and 215d may together form a polysilicon TFT (poly-TFT) (in FIG. 3E).

Figure 3E:
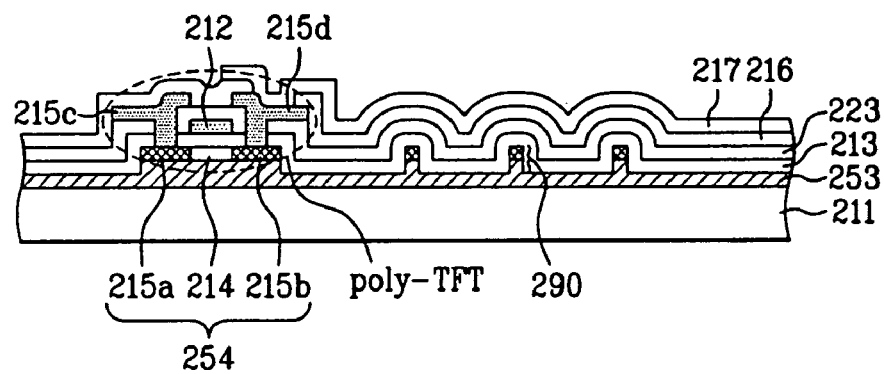

In FIG. 3E, an inorganic insulating layer, such as silicon nitride or silicon oxide, may be deposited along an entire surface of the substrate 211 including the poly-TFT, or an organic insulating layer, such as enzocyclobutene (BCB) or an acrylic resin, may be deposited along an entire surface of the substrate 211, thereby forming a passivation layer 216. Next, a predetermined portion of the passivation layer 216 may be removed by a photolithographic process using a fifth mask to form a second contact hole 291 exposing the drain electrode 215b (in FIG. 3F). Then, a transparent conductive material, such as indium-tin-oxide (ITO) or indium-zinc-oxide (IZO), may be deposited along an entire surface of the substrate 211 including the passivation layer 216, and patterned by a photolithographic process using a sixth mask, thereby forming a transmitting electrode 217 electrically connected to the drain electrode 215b in the pixel region. The transmitting electrode 217 may be formed within the transmitting part of the pixel region or within an entire portion of the pixel region.

Figure 3F:
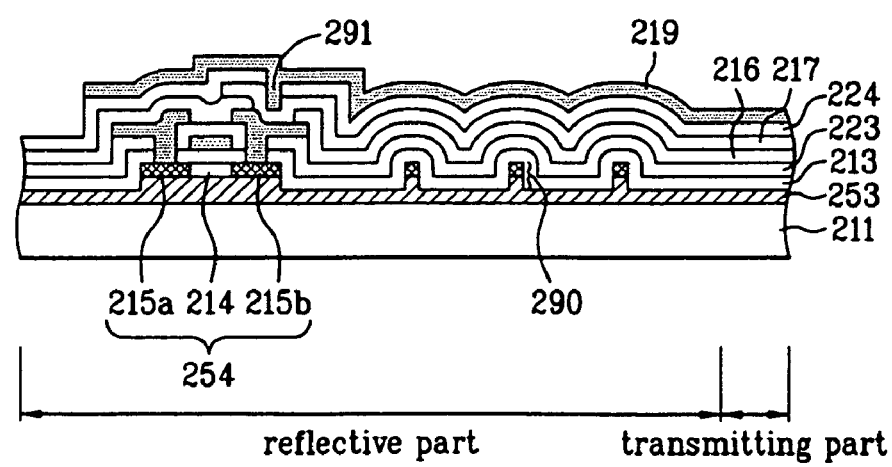

In FIG. 3F, an inorganic insulating layer, such as silicon nitride or silicon oxide,. may be deposited along an entire surface of the substrate 211 including the transmitting electrode 217 to form a second insulating interlayer 224. Then, the second insulating interlayer 224 corresponding to the second contact hole 291 may be removed by a photolithographic process using a seventh mask. Accordingly, some portion of the drain electrode 215b or the transmitting electrode 217 may be exposed by the second contact hole 291.

Subsequently, a metal layer having high reflexibility, such as aluminum Al, aluminum alloy AlNd, copper Cu, silver Ag, molybdenum Mo, chrome Cr, titanium Ti, tantalum Ta, or molybdenum-tungsten MoW, may be formed along an entire surface of the substrate 211 including the second insulating interlayer 224, and patterned by a photolithographic process using an eighth mask, thereby forming a reflective electrode 219. The reflective electrode 219 may have a reflective projection thereunder due to the projection seed pattern 290. Accordingly, projection-type curvatures may be formed in the gate insulating layer 213, the first insulating interlayer 223, the passivation layer 216, and the second insulating interlayer 224 as a result of the projection seed pattern 290. In addition., the reflective electrode 219 may be formed along the surface of the second insulating interlayer 224, whereby the reflective electrode 219 may have the projection-type curvature.

According to the present invention, if ambient light is used as a light source, the projection of the reflective electrode 219 may partially change a reflection angle of the ambient light, thereby obtaining a wide viewing angle. In addition, the reflective electrode 219 may contact some portion of the drain electrode 215*b* or the transmitting electrode 217 through the second contact hole 219. Furthermore, the reflective electrode 219 may be overlapped with the gate line, the data line, and the thin film transistor to prevent light leakage, wherein the reflective electrode 219 may be formed within the reflective part of the unit pixel region. For example, the reflective electrode 219 may be formed of a high reflexibility metal material within the reflective part of the unit pixel region, and the transmitting electrode of the transparent conductive material may be formed within the transmitting part of the unit pixel region, thereby obtaining both reflective and transmitting type functions.

According to the present invention, any one of the reflective and transmitting electrodes may be in contact with the poly-TFT, and the reflective electrode may be in contact with the transmitting electrode. Thus, it may be possible to simultaneously transmit signals of the TFT to the reflective and transmitting electrodes.

Alternatively, the reflective part and the transmitting part may be respectively formed within upper and lower portions of the unit pixel region having circular shapes. Accordingly, the reflective part may be formed along a circumference of the pixel region, and the transmitting part may be formed at a center region of the pixel region.

According to the present invention, a TFT substrate of a transflective-type LCD device including a poly-TFT, a semiconductor layer, and a projection pattern may be simultaneously formed. Thus, it may be possible to decrease a total number of masks used to fabricate the transflective-type LCD device. In addition, according to the present invention, forming s reflective electrode having reflective projections may be applicable to a reflective-type LCD device as well as a transflective-type LCD device.

According to the present invention, by forming a semiconductor layer and a projection seed pattern at the same time, additional processes of forming the projection seed pattern may not be necessary.

It will be apparent to those skilled in the art that various modifications and variations can be made in the transflective-type LCD device and the method of fabricating a transflective-type LCD device of the present invention without departing from the spirit of scope of the invention. Thus, it is intended that the present invention cover the modifications and variations of this invention provided they come within the scope of the appended claims and their equivalents.

What is claimed is:

1. A method of fabricating a transflective-type liquid crystal display device, comprising:
   forming a buffer layer and a semiconductor layer on a substrate;
   patterning the buffer layer and the semiconductor layer to simultaneously form an active layer of a thin film transistor and a projection seed pattern, wherein the buffer layer of the active layer area and the projection seed pattern area has a different height than the buffer layer of a remaining area;
   forming a gate insulating layer along an entire surface of the substrate;
   forming a gate electrode on the gate insulating layer above the active layer;
   forming source/drain regions within the active layer using the gate electrode as a mask;
   depositing an insulating interlayer along an entire surface of the substrate;
   forming source/drain electrodes connected to the source/drain regions;
   forming a passivation layer along an entire surface of the substrate including the source/drain electrodes;
   forming a first pixel electrode on the passivation layer to contact the drain electrode; and
   forming a second pixel electrode contacting the first pixel electrode.

2. The method according to claim 1, wherein the buffer layer includes an inorganic insulating material.

3. The method according to claim 1, wherein an insulating layer is formed between the first pixel electrode and the second pixel electrode.

4. The method according to claim 1, wherein one of the first and second pixel electrodes includes a reflective electrode material layer.

5. The method according to claim 4, wherein the reflective electrode material layer includes a reflective projection corresponding to the projection seed pattern.

* * * * *